Aug. 9, 1960 C. A. MOUNTEER ET AL 2,948,887
PRESSURE RESPONSIVE INSTRUMENT
Filed June 6, 1955 4 Sheets-Sheet 1
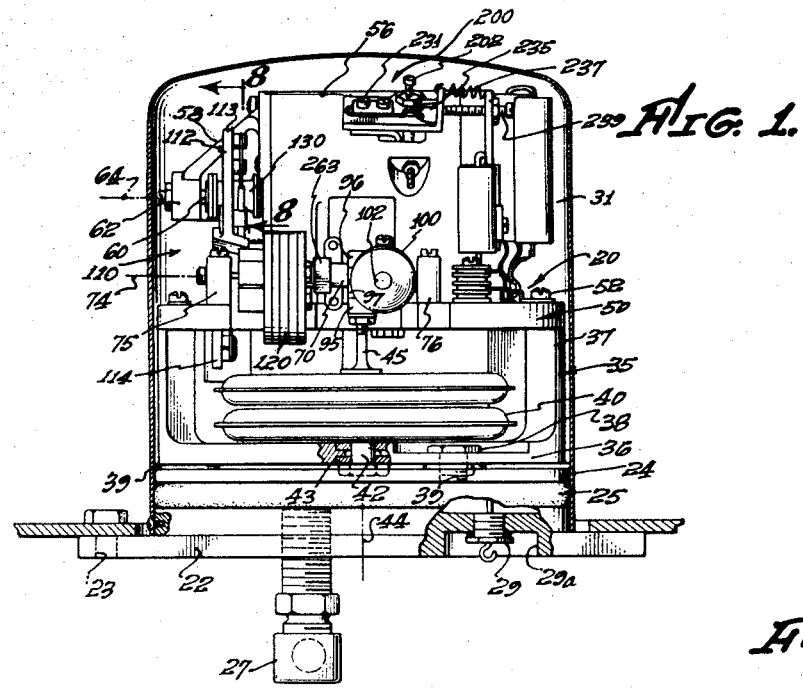
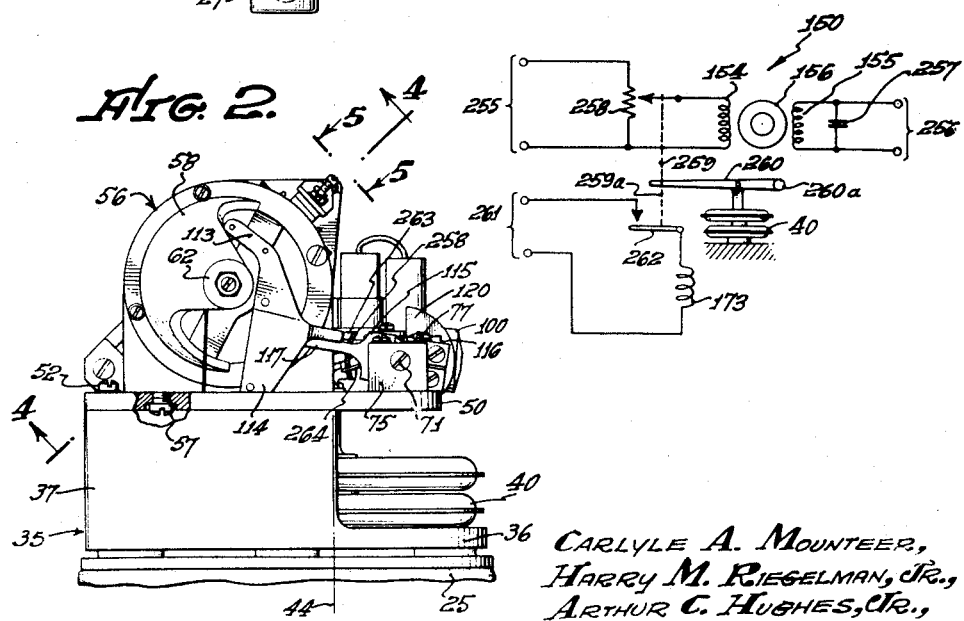
CARLYLE A. MOUNTEER,
HARRY M. RIEGELMAN, JR.,
ARTHUR C. HUGHES, JR.,
INVENTORS.
BY
Barlow & Scantlebury
ATTORNEYS

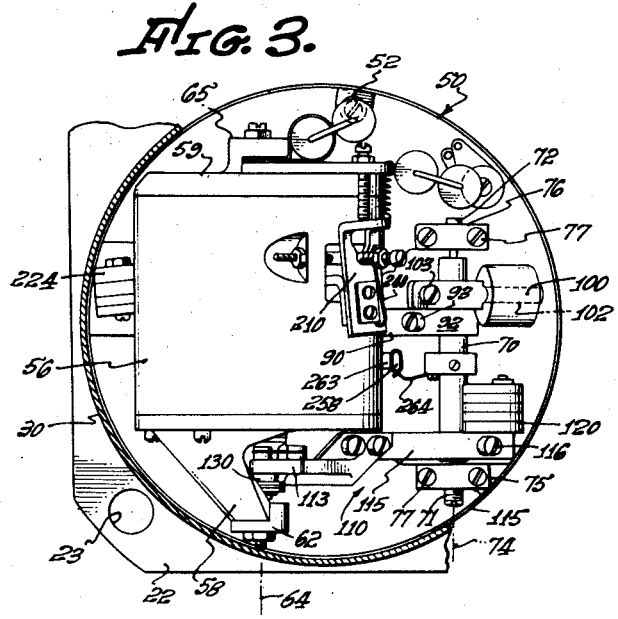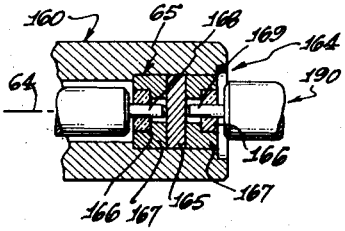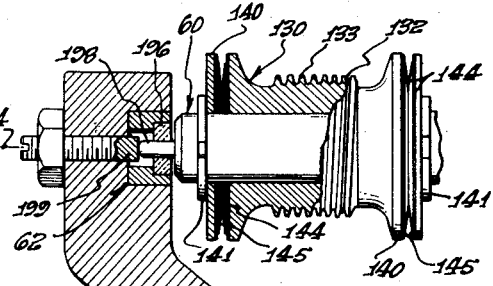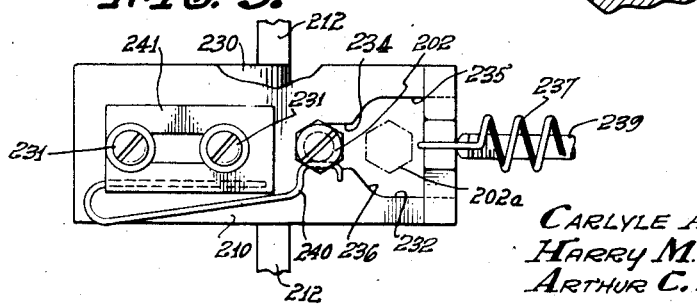

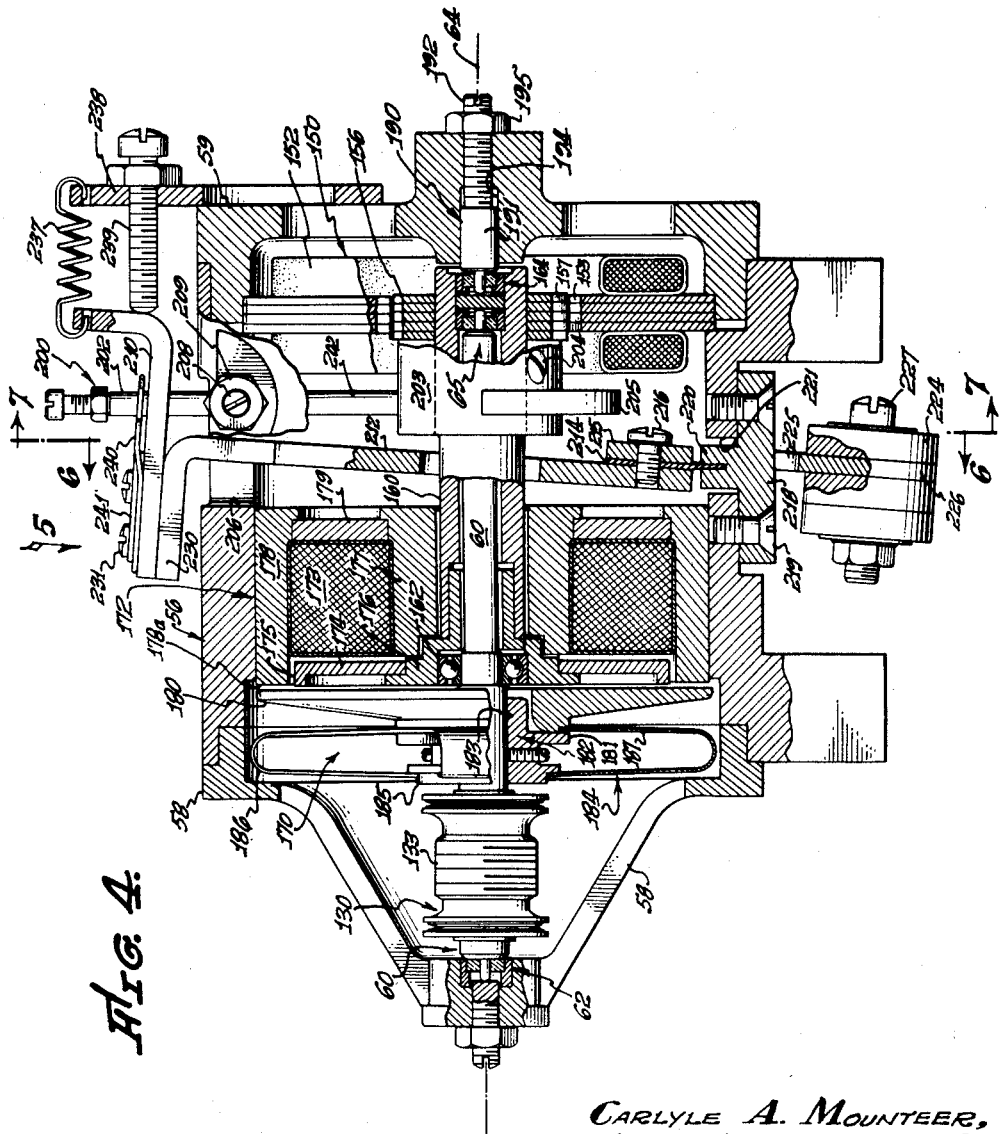

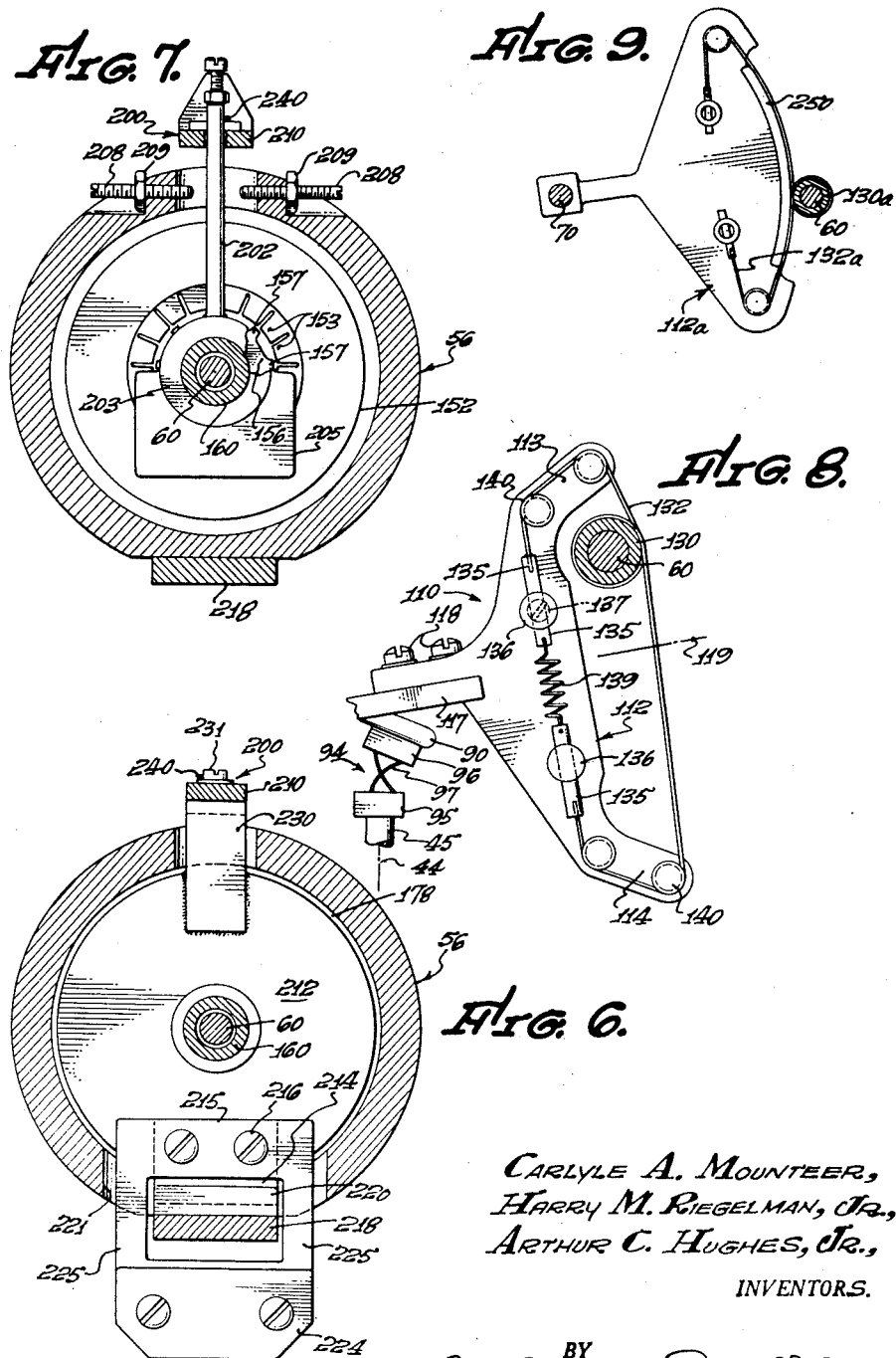

2,948,887

PRESSURE RESPONSIVE INSTRUMENT

Carlyle A. Mounteer, Pasadena, Harry M. Riegelman, Jr., Los Angeles, and Arthur C. Hughes, Jr., Pacific Palisades, Calif., assignors to Giannini Controls Corporation, a corporation of New York Filed June 6, 1955, Ser. No. 513,378

6 Claims. (Cl. 340—345)

This invention has to do generally with apparatus that is responsive to input data and that is capable of producing a corresponding output signal. Illustrative of such apparatus are instruments responsive to a fluid pressure.

An important aspect of the invention is concerned with such apparatus that is shiftable between two conditions, which may be referred to, respectively, as an operating condition, in which the output signal corresponds to variations of the input data, and an idle condition, in which the output signal is independent of that input data. The invention relates particularly to means for shifting from the second of those conditions to the first smoothly and reliably.

That aspect of the invention relates typically to altitude controllers for aircraft, which are responsive to static air pressure supplied as input signal from any suitable source. Such controllers may, for example, produce when in idle condition, a uniform zero output signal that is independent of the altitude; and may produce, when in operating condition, a signal that represents the difference between the instant value of the static pressure and its value at the moment of shifting to operating condition. Such an output signal may be utilized in known manner for control of aircraft. The latter term is employed throughout the present specification and claims, unless the context requires otherwise, to include all vehicles adapted to move through the atmosphere.

An important object of the invention is to provide means for maintaining the output signal means in accurately uniform condition during idle condition of the apparatus, and for completely releasing the output means from such constraint when the apparatus is shifted to operating condition.

A further object of the invention concerns reliable and economical means for controlling the shifting of the apparatus from idle to operating condition, and for releasing the output means in proper timed relation to that shift.

A further object of the invention is to provide improved linkage means in an instrument of the type defined, for coupling a pressure responsive device with a signal generating device. Since optimum operation of such an instrument requires bearings capable of unusually high performance, the invention is concerned further with certain novel bearing structures that are particularly well adapted for such use.

A further object of the invention concerns means for protecting an instrument of the type described from damage due to abnormal conditions.

Other aspects of the invention relate to particularly effective and convenient structural features of such instruments, for facilitating precise adjustments, insuring reliable operation and the like, as will be more fully described.

A full understanding of the invention and of its further objects and advantages will be had from the following description of certain embodiments, of which description the accompanying drawings form a part. That description is intended for illustration, and the specific structures described and the particulars of the drawings are not to be interpreted as limiting the proper scope of the invention, which is defined in the appended claims.

In the drawings:

Fig. 1 is a side elevation, partly broken away, representing an illustrative embodiment of the invention;

Fig. 2 is a fragmentary end elevation;

Fig. 3 is a plan;

Fig. 4 is an oblique section on line 4—4 of Fig. 2;

Fig. 4A is a fragmentary section corresponding to a portion of Fig. 4 at enlarged scale;

Fig. 4B is a fragmentary section corresponding to another portion of Fig. 4 at enlarged scale;

Fig. 5 is a fragmentary view in the aspect of arrow 5 of Fig. 4;

Fig. 6 is a section on line 6—6 of Fig. 4;

Fig. 7 is a section on line 7—7 of Fig. 4;

Fig. 8 is a section on line 8—8 of Fig. 1;

Fig. 9 is a section similar to Fig. 8 but illustrating a modification; and

Fig. 10 is a schematic diagram illustrating electrical circuit connections and related features of the invention.

Figs. 1 to 8 represent an instrument that illustratively embodies the invention. That instrument is adapted to receive as input signal an air pressure, which typically is the static pressure of the surrounding atmosphere, obtained from a suitable static pressure pickup device of known type. That pressure operates through a pressure responsive device such as a capsule to rotate a main shaft. That shaft is related to an output shaft through a releasable clutch. In idle condition of the instrument that clutch is released, and the output shaft is therefore independent of the input pressure. In operating condition of the instrument the clutch is engaged, and the output shaft is responsive to any changes of input pressure that occur during such operating condition. An output signal may thus be developed that represents those pressure changes. Such a signal may be used, for example, to control the flight of an aircraft in a manner to maintain its altitude constant. For such a purpose it is desirable to maintain the output shaft accurately in a definite zero position during idle condition of the instrument, and to release it in definite timed relation to engagement of the described clutch.

As illustratively shown, with particular reference to Figs. 1 and 2, the instrument has a main frame, indicated generally by the numeral 20. Frame 20 is mounted on a base 22, which may be essentially a square plate. Base 22 is provided with any suitable mounting means, such as the holes 23. A circular flange 24 on the upper face of base 22, as shown, for example, in Fig. 1, receives the cylindrical cover 30. An O-ring 25 is preferably provided in a peripheral groove in flange 24, forming a seal between the cover and base. A pressure-tight chamber 31 is thereby formed, within which the main frame and all moving parts of the instrument are mounted. The instrument is responsive to fluid pressure supplied to that chamber. A connection tube for supply of control pressure, as indicated at 27, is threaded into a through bore in base 22 and is preferably provided with a filter screen to exclude dust and the like. In typical applications of the instrument, tube 27 is connected to the regular static pressure line of an aircraft, in which the air pressure represents the existing static pressure of the surrounding atmosphere and thus provides a measure of altitude.

Electrical connections to the instrument for such purposes as will be described, may be provided by insulated electrical terminals set in the base as indicated at 29 the exterior portion of the terminals being preferably protected by a recess 29a. Electrical connections between those terminals and the various electrical components to be described are omitted from the drawings for clarity of illustration.

The main frame 20 of the instrument comprises a frame portion 35 and a mounting plate 50. Frame portion 35 has a base portion 36 in the form of a flat plate, and an upstanding flange portion 37. It is mounted in spaced parallel relation to base 22 by means of three screws 38 and spacers 39, the latter being preferably of heat insulative material to reduce heat transfer from the base to the instrument proper. As will become clear, that novel construction makes the instrument proper largely independent of rapid temperature changes of the surroundings, since the three insulative posts 39 constitute the only solid path for temperature flow between the main instrument frame 20 and the enclosing walls comprising base 22 and cover 30. Temperature transmission is preferably further reduced by chrome plating both the inner and outer faces of cover 30.

For convenience and clarity of description, the orientation of the instrument with respect to gravity will be taken as shown in Fig. 1, for example, and the elevation seen in Fig. 2 will be considered the front of the instrument. However, that is not intended to imply any limitation of the actual orientation of the instrument to that or any other orientation.

A pressure responsive element, shown as the dual capsule 40, has its lower end rigidly mounted on the upper face of frame base 36. As shown, a threaded post 42, fixed to the capsule face, extends in spaced relation through a hole in the frame and is secured by a nut and two washers 43 of heat insulative material such as formica, for example. Those washers thus form the only solid path for heat flow between the frame and capsule, further reducing temperature effects upon the capsule. Capsule 40 is airtight and its interior is evacuated, so that with decreasing pressure in the surrounding chamber 31 it becomes deformed in the sense of expansion along capsule axis 44. Thus the upper end of the capsule moves upward with decreasing static pressure, or increasing altitude of the aircraft. An axially extending actuating rod 45 is rigidly mounted on the upper face of capsule 40, and transmits that capsule movement to other parts of the instrument, to be described.

Mounting plate 50 is rigidly mounted, as by the screws 52, on frame flange portion 37 in parallel spaced relation to frame base 36, and forms with the frame portion a partially enclosed chamber containing the capsule. Mounting plate 50 is cut away to provide clearance for actuating rod 45 and for other parts of the apparatus where necessary.

The main shaft 60 of the instrument is journaled on a horizontal axis 64 (Figs. 1, 3 and 4) in a housing 56, which is rigidly mounted on the upper face of plate 50, as by the screws 57. The front bearing 62 for shaft 60 is carried by an end bell 58 which forms one end of the housing, of which it may be considered an integral part. The rear bearing 65 is supported in a manner to be more fully described by a housing end plate 59, which is mounted on the housing in a manner permitting rotational adjustment about shaft axis 64.

An actuator shaft 70 is journaled on a horizontal axis 74 parallel to main axis 64 on front and rear bearings 71 and 72. Those bearings are carried by the brackets 75 and 76, respectively, rigidly mounted on plate 50, as by the screws 77. For optimum operation of the instrument it is essential that the bearings of both main shaft 60 and actuator shaft 70 be substantially free of side or end play and produce an absolute minimum of friction. A preferred type of bearing for the present purpose comprises a novel form of jewel bearing of journal type in which the thrust is taken directly on the axis. Bearings 71 and 72 are typically of substantially the same construction as front bearing 62 of the main shaft, to be described in connection with Fig. 4A.

Actuator shaft 70 carries an actuator arm 90, rigidly mounted on the shaft in adjustable position by means of the clamp block 92 and screw 93. Capsule rod 45 is linked to the end of actuator arm 90 by structure that permits limited relative rotation of those parts. That linkage mechanism is shown best in Fig. 8 as a flexure pivot 94, which comprises pivot blocks 95 and 96 rigidly mounted on rod 45 and on arm 90, respectively, and joined by the crossed spring 97. Movement of the capsule and rod 45 along capsule axis 44 produces corresponding rotation of actuator shaft 70. A counterweight 100 is mounted on shaft 70 in position to dynamically balance the shaft assembly. As shown in Figs. 1 and 2, the weight is mounted by means of a threaded post 102, rigidly clamped in radial relation to the shaft by the clamp screw 103 in rotationally adjustable position. Weight 100 is threaded directly on post 102 and may be adjusted radially by rotation with respect to the post and clamped, as by a lock nut, not shown.

Rotation of actuator shaft 70 is transmitted accurately and with relatively high amplification to main shaft 60 by a cable and drum mechanism indicated generally by the numeral 110. A yoke 112, comprising two angularly spaced arms 113 and 114 (Fig. 8), is rigidly mounted on actuator shaft 70, as by the clamp block 115 and the clamping screw 116. A supporting arm 117 is preferably formed integrally with block 115, and yoke 112 is mounted in radially adjustable position on that arm, as by the screws 118 which work in radially slotted holes. The face of arm 117 on which the yoke is thus mounted lies in a plane, indicated by the line 119 in Fig. 8, which is approximately an axial plane with respect to actuator shaft 70, but which does not bisect the axial planes through the two arms of yoke 112. As shown, plane 119 lies angularly closer to the end of yoke arm 113 than to 114. Hence radial adjustment of the yoke along its supporting arm 117 alters the radial distance of one of the yoke arms more than that of the other. That adjustment therefore provides a convenient means of making the radial distances of the two arm extremities accurately equal. The mass of the yoke and its mounting is preferably dynamically balanced, as by the counterweights 120, screwed directly to block 115. A balance screw may be threaded in block 115 perpendicularly to the plane 119, providing a fine adjustment for that balance.

A drum 130 is mounted on main shaft 60 in a manner to be more fully described. A flexible cable 132 extends tautly between the arms of yoke 112, passing twice around drum 130 in a helical thread 133 cut in the drum surface. That surface is preferably finished in such a way, as by liquid honing, to give a slight but uniform roughness, so that the two turns of cable grips the drum firmly without slipping. The cable preferably leaves the drum surface on the side radially farthest from actuator shaft 70, that arrangement providing increased amplification of the motion. Yoke arms 113 and 114 are bent, as shown in Fig. 8, with their outer portions extending substantially radially, providing clearance for the drum as the yoke swings with actuator shaft 70. The two reaches of the cable, above and below the drum, lie approximately on a circular arc about actuator shaft 70 and tangent to the outer face of drum 130. However, swinging of the yoke about axis 74 causes the cable to shift slightly transversely of that arc, altering the effective length of the cable by an amount that is of second order but would affect the tautness of the cable if not compensated.

A particularly satisfactory manner of mounting cable 132 to maintain uniform tension without loss of accuracy and without adding excessive mass or moment of inertia to the yoke assembly is shown in illustrative form in Fig. 8, for example. An advantage of that mechanism is its suitability to the use of relatively fine braided cable. A particularly suitable type of cable has been found to comprise sixteen strands of platinum wire, each about 0.0008 inch in diameter, braided in pairs. Such cable is extremely flexible, reducing friction and resilience of the linkage to a negligible value, and yet is longitudinally remarkably stable particularly after being vigorously prestretched. The ends of that cable are secured, as by soldering, in axial bores in mounting spindles 135. Each of those spindles is received in a cross bore in a post 136, mounted on the rearward face of yoke 112. One spindle is clamped in adjustable position by a lock screw 137, axially threaded in the post and accessible from the front of the yoke. The other spindle is freely movable transversely of its post 136, which acts as a guide. That movement is controlled by a tension spring 139 connected to the end of the spindle opposite to the cable. In the particularly convenient arrangement shown, the two spindles 135 are mounted in longitudinal alignment, with spring 139 stretched between their adjacent ends. The cable is led from their opposite ends over annular grooves in the posts 140, which are fixedly mounted at the ends and at the elbows of the two yoke arms. Those posts may be rotatably mounted if preferred. However, it has been found that with smoothly finished grooves they may be fixed and yet act satisfactorily as sheaves for the flexible cable. As shown, the upper end of the cable is anchored and therefore may be considered to define the rotary position of drum 130. The lower cable end is longitudinally movable over the sheave posts and in the guiding hole of post 136 in response to tension of spring 139. That action maintains the cable uniformly taut throughout its length, insuring firm grip of the drum and accurate definition of the drum position.

As yoke 112 swings from one end of its excursion to the other, drum 130 typically turns through an angle appreciably greater than 360°. That drum rotation causes the cable to work along the helical thread 133 of the drum. To accommodate that movement, the two arms 113 and 114 of yoke 112 are mutually offset longitudinally of the drum axis, as shown for example, in Fig. 1. That offset is such that each reach of the cable leads properly between yoke arm and drum when at its minimum length. The slight departure from accurate lead as the reach increases in length may be neglected.

Drum 130 is preferably not fixed on main shaft 60, but is related to it by means of a friction slip mechanism of any suitable type that acts as a rigid connection under relatively low loads, but that permits relative rotation of the drum and shaft in response to a torque that exceeds some predetermined value. That limiting value is made appreciably less than would strain cable 132 or any other part of the mechanism. Such a friction slip insures against damage to the instrument from accidental shocks or abnormal conditions of various kinds. As shown best in Fig. 4A, drum 130 is rotatably mounted on shaft 60 in spaced relation between two washers 140, which are positioned by the snap rings 141 set in peripheral grooves in the shaft. Between the drum and each of washers 140 is a pair of friction washers 144 of relatively thin steel, which are spring urged apart as by two oppositely dished spring washers 145. The spring washers are preformed to a curvature that provides in the final assembly the desired degree of friction between the drum and shaft. That friction is such that during normal operation of the instrument the drum is effectively fixed on the shaft.

Tube 160 is journaled in coaxial relation to main shaft 60, to which it may be releasably connected by the clutch mechanism 170. In the present embodiment, as shown especially in Fig. 4, clutch 170 is controlled by the solenoid 172, the clutch being released when the solenoid is not energized and being engaged in response to solenoid energization. Tube 160, which is in effect an output shaft, carries an output device responsive to shaft rotation and acting to produce an electrical signal that represents the angular departure of the shaft from a normal, or zero, position. That output device may be of many different types, according to such factors as the type of signal desired. In the present embodiment it comprises a transducer 150 of special construction which acts as an inductance potentiometer.

Tranducer 150 comprises a stator 152, mounted in fixed relation to housing end plate 59, and a rotor 156, fixedly mounted on the tube 160. Rotor 156 comprises a plurality of laminations of readily magnetizable material and is of generally annular form with a plurality of poles 157, which extend radially outwardly and are typically eight in number. Stator 152 carries primary and secondary windings on a core which is of generally annular form with sixteen poles 153 extending radially inwardly and having end faces in closely spaced relation to the eight rotor poles. The primary stator winding comprises eight series-connected coils that enclose respective alternate pairs of stator poles 153. The secondary winding is similar to the primary, but pairs of poles enclosed by the respective secondary coils are in staggered relation to those for the primary. Thus each pole is associated with its neighbor on one side to form a core for a primary coil, and with its neighbor on the other side to form a core for a secondary coil. Successive primary coils alternate in direction of winding, so that the magnetization produced in the two poles within each secondary coil is oppositely directed. Hence if those two poles are equally magnetized by the primary current, the secondary voltage is substantially zero. That is the case when rotor 156 has its poles symmetrically oriented with respect to gaps between stator poles, for the magnetic circuits through all stator poles are then equal. But slight rotation of rotor 156 from such zero position increases the magnetization of alternate stator poles, and decreases that of the others. The result is an induced secondary proportional voltage, which is approximately either in phase or of opposite phase with respect to the alternating current voltage supplied to the primary, the phase depending upon the direction of rotor rotation. The phase relation may be made substantially exactly that described by suitable circuit adjustments.

For a given voltage supply available for the primary of transducer 150, the magnitude of the output voltage per unit angle of shaft rotation is preferably adjusted to the desired value by adjustment of the voltage actually applied to the transducer primary. For example, a variable resistor may be connected in series with the primary, or, for example, may be connected as a potentiometer.

The output of the described type of transducer may be made a substantially linear function of rotor rotation up to angles of as much as 12 degrees on each side of zero, whereas the present illustrative instrument typically requires an angular excursion of only about 3 degrees on each side of zero.

With clutch 170 engaged, tube 160 is effectively a part of main shaft 60, causing output transducer 150 to respond directly to movements of that shaft, controlled as already described by pressure responsive capsule 40. When clutch 170 is released, tube 160 is effectively free of main shaft 60, so that the tube and output transducer rotor 156 may be angularly positioned independently of that shaft.

An important aspect of the present invention is the provision of means for positively positioning the output means, here represented as rotor 156, in a definite zero position when it is free of input shaft 60, and for completely releasing it from that restraint when it is connected to that input. Such positioning of the output means will be referred to as caging. Caging position of the output shaft is typically such as to produce minimum output signal.

Illustrative caging means of particularly effective type is designated generally by the numeral 200, it being understood that many changes may be made in that specific structure and in the manner of controlling it without departing from the proper scope of the present invention. An important further feature of the present caging means is that it is controlled by the same solenoid 172 that controls clutch 170, making for great compactness and economy, and also insuring correct relationship between clutching and caging action.

The present embodiment employs a particularly convenient and effective arrangement of bearings for shaft 60 and tube 160, combining remarkably low friction for mutual rotation of those two elements when clutch 170 is released and extremely low friction for rotation of both elements together with respect to housing 56 when the clutch is engaged. The ends of shaft 60 carry pivot formations which are received by journal type jewel bearings, the forward bearing 62 being mounted in housing end bell 58 (Figs. 4 and 4A) and the rearward bearing 65 being mounted in tube 160 near its rearward end (Figs. 4 and 4B). The tube has its rearward end supported with respect to housing end plate 59 by a similar journal type jewel bearing 164, while the forward end of the tube is journaled with respect to shaft 60 by means of a ball bearing, indicated at 162. Ball bearing 162 is not required to take any end thrust, rearward thrust of tube 160 being taken at bearing 164 and forward thrust being transmitted via shaft 60 to bearing 62.

Bearings 65 and 164 are preferably arranged as shown best in Fig. 4B, the jewels of both bearings being mounted back to back in the axial bore of tube 160 with thrust plate 165 between them. Each annular jewel 166 is mounted in an annular bushing 167 of suitable outside diameter for a pressure fit in the tube. Bearing plate 165 has accurately parallel hardened and smooth faces and is clamped accurately perpendicular to shaft axis 64 by the adjacent faces of bushings 167. A bearing pivot 168, formed on the rearward end of shaft 60, has accurately cylindrical walls of a diameter to be fittingly received by the jewel of bearing 65, and extends through that jewel and abuts plate 165, the end face of the pivot being spherically curved so that contact with the plate occurs only at axis 64.

A supporting pivot 169 for bearing 164 is formed on the forward end of a pin 190, coaxially mounted in housing end plate 59. Pin 190 preferably has a smooth cylindrical portion 191 fittingly received in the smooth forward portion 194 of a bore in that plate, the rearward portion of that bore being threaded and engaging a threaded portion 192 of the pin, thus providing convenient axial adjustment of the bearings. A lock nut 195 may be provided on the threaded rearward end of the pin.

Forward bearing 62 of shaft 60 comprises a cylindrical pivot 198 formed on that shaft and received by an annular jewel 196 which is set in a bushing in a bore 197 in end bell 58. The end of pivot 198 is rounded and abuts a flat smooth face which may be formed directly on the end of a screw 199 threaded into the forward portion of bore 197.

Clutch 170, as illustratively shown, comprises a clutch plate 174, fixed on the forward end of tube 160 and having a forwardly extending peripheral flange 175. Clutch plate 174 is mounted on a hub portion 176 of tube 160, which serves also as a housing for journal bearing 162. An armature clutch plate 180 is rotatively fixed with respect to shaft 60, but is axially movable between an engaged position in which its rearward face contacts flange 175 of plate 174 and a released position, as represented in Fig. 4, in closely spaced relation to that flange. A convenient and effective means of mounting armature 180 is illustratively shown. A hub 182 is fixed on shaft 60 and carries a spider 184 of spring material. That spider comprises four arms having one end 185 rigidly mounted on hub 182 and extending radially therefrom. Each arm is bent in hairpin form at 186 and has its other end 187 connected to clutch armature 180. The arms are of spring sheet material, their straight portions lying in planes normal to axis 64. They thus are readily deformable in an axial direction, but stiffly resist any relative rotation of their ends about that axis. Clutch armature 180 is preferably of annular form, and its inner circular edge is guided in its axial movement by a cylindrical rearward projection 183 of hub 182. Forward movement of the armature is limited by contact with a flange 181 of that hub. Spring spider 184 is preferably so prestressed as to urge armature 180 normally against flange 181 with a force that is readily overcome upon energization of solenoid 172.

Solenoid 172 comprises an annular winding 173 mounted between an inner core sleeve 177 and an outer core sleeve 178. The two sleeves are rigidly related by the annular disk 179, to which they are connected as by soldering. That solenoid assembly is fixedly mounted in housing 56, as by light press fit of outer core sleeve 178 in the inner cylindrical surface of the housing. The two core sleeves are made of high permeability magnetic material, and disk 179 is of non-magnetic material such as brass or stainless steel. Hub portion 176 of tube 160 may be of magnetic material. A magnetic circuit for the lines of force that surround winding 173 when energized is thereby provided by magnetic material except at the ends of the winding. Clutch armature 180 at the forward end of the winding is constructed of magnetizable material, thus tending to complete that magnetic circuit. Energization of winding 173 therefore causes the armature to be strongly drawn toward the solenoid, producing clutch engagement when that armature engages clutch plate 174. The outer portion of the armature is positively prevented by that engagement from reaching the forward edge face 178a of outer core sleeve 178, but remains closely spaced from that face and hence free to rotate relative to the housing. Upon de-energization of solenoid 172, spider 184 moves armature 180 axially forward, releasing the clutch.

Caging means 200 comprises a caging arm 202, fixedly mounted on tube 160 by means of the hub 203 and set screws 204 (Fig. 4). Hub 203 preferably carries a counterweight 205 which dynamically balances arm 202. As shown, caging arm 202 extends radially with respect to axis 64 through a clearance aperture 206 in housing 56. Limit stops are preferably provided, shown typically as the stop screws 208, threaded into housing 56 on opposite sides of aperture 206, and provided with lock nuts 209. Rotation of arm 202 when uncaged is thereby limited to a small angle, typically about 3 to 5 degrees, on each side of its zero position.

The free end of caging arm 202 is engageable outside the housing by a caging yoke 210. Yoke 210 is carried at the free end of a caging armature 212, which is of flat annular form and is pivoted at its edge opposite to yoke 210 on a pivot axis perpendicular to main shaft axis 64. Armature 212 is coaxial with solenoid 172 and surrounds shaft 60 and tube 160 in spaced relation. The armature pivot is preferably of a type having no play. As shown, it is a flexure pivot, comprising a hinge 214 of thin spring material having one edge rigidly connected to armature 212, as by the keeper plate 215 and screws 216. The other edge of spring hinge 214 is fixed with respect to the housing. As shown, a bracket 218 is mounted by the screws 219 on a flattened outer face of housing 56, with an elongated boss 220 projecting inwardly through a slot 221 in the housing. A channel in boss 220 receives the edge of hinge 214, wich may be retained as by solder. Bracket boss 220 and caging armature 212 are spaced apart, leaving a narrow portion of hinge 214 unsupported and free to bend through the small angle required for actuation or release of the caging mechanism. Caging armature 212 is preferably counterbalanced, as by a weight 224, which may be mounted on the armature in any suitable manner. As shown, keeper plate 215 is formed integrally with two arms 225 that extend through clearance slot 221 on opposite sides of hinge bracket 218 (Fig. 6) and are joined by a plate portion 226 on which weights 224 are mounted by screws 227 externally of the housing.

Caging yoke 210 may comprise a plate-like member mounted on the free end of caging armature 212 by means of the bracket 230 and the screws 231. A generally V-shaped aperture 232 (Fig. 5) in the plate receives the end of caging arm 202, limiting its movement about shaft axis 64, the degree of that limitation depending upon the position of armature 212. A spring 237, extending between yoke 210 and a bracket 238 fixed on housing 56, tends to swing the yoke and armature 212 away from solenoid 172 into caging position, as shown in Fig. 4, for example, that movement being preferably limited by an adjustable stop screw 239, threaded into bracket 238. With the caging mechanism in that caging position, caging arm 202, lies in the relatively narrow parallel-sided slot portion 234 of aperture 232, as shown in solid lines in Fig. 5. Slot 234 is preferably slightly wider than arm 202, to insure against binding; and the arm position is defined effectively positively by a positioning spring 240, one end of which may be clamped under a keeper plate 241 by screws 231. The free end of spring 240 lies parallel to one side of slot 234 and yieldingly urges arm 202 against the other side.

When solenoid 172 is energized, armature 212 is drawn to the left, as shown in Figs. 4 and 5, against the force of spring 237 into contact with the ends of core sleeves 177 and 178. That produces relative movement of caging arm 202 with respect to yoke 210 into the position shown in phantom lines at 202a in Fig. 5. That places the caging arm in the relatively wide portion 235 of aperture 232, releasing it for swinging movement about axis 64. The walls of aperture portion 235 are typically widely enough spaced to accommodate the full movement of the caging arm permitted by stop screws 208. The intermediate portion of aperture 232 has tapering walls which form camming surfaces 236. When solenoid 172 is de-energized and spring 237 returns the caging mechanism to caging position, those camming surfaces return arm 202 to its zero position and guide it into caging slot 234.

An important aspect of the invention provides timing control to insure that upon solenoid energization the resulting actions of clutch engagement and caging release will take place in the proper time relation. The time relation provided by the present embodiment is such that clutch 170 becomes fully engaged, linking tube 160 and shaft 60, before the caging mechanism releases tube 160 from its caged relation to the instrument frame. That time relation is brought about by two features of the present mechanism, which preferably operate in conjunction but either one of which might be employed itself to provide the desired action.

One of those features concerns the relative positions assumed by clutch armature 180 and caging armature 212 with respect to the solenoid core in de-energized condition of the solenoid. As shown clearly in Fig. 4, clutch armature 180 is then relatively closely spaced from outer core sleeve 178 and from hub 176 which acts as an extension of inner core sleeve 177. The air gaps in that portion of the magnetic circuit are therefore relatively small, and solenoid energization produces prompt and strong attractive force upon the clutch armature. Moreover, only relatively slight movement of that armature is required to engage the clutch. Caging armature 212, on the other hand, is relatively widely spaced from the solenoid core in idle condition of the solenoid, at least throughout the greater part of its periphery. Because of the relatively great average air gap, solenoid energization initially exerts less force upon the caging armature than upon the clutch armature. That force, however, becomes considerably increased by virtue of clutch engagement, since the air gaps at the clutch armature are then virtually, although not quite, closed, reducing the reluctance of the magnetic circuit. Spring 237 can be adjusted to a tension that will prevent movement of armature 180 in response to initial solenoid energization, but will permit such movement after the magnetic action has been strengthened by clutch engagement. And even with spring 237 considerably less tight, the described action tends to delay caging release until after the clutch is fully engaged.

A second feature contributing to the same result is the form of caging slot 234 in caging yoke 210. The parallel walls of that slot do not release caging arm 202 until the yoke has moved an appreciable distance from caging position. Hence even if the clutch and caging armatures are accelerated at the same rate upon solenoid energization, the relatively short travel required for clutch engagement is completed before caging arm 202 is free of slot 234. With the two described features cooperating, the time delay between clutch engagement and caging release can readily be controlled without sacrifice of positive and reliable performance of both actions.

Fig. 9 represents an alternative structure for yoke 112 of the cable-drum drive mechanism already described. Yoke 112a of Fig. 9 includes a circularly curved cable supporting surface 250 having its center on the actuator shaft axis and closely spaced from the surface of drum 130a, which may be like drum 130 of the preferred embodiment. Cable 132a leaves drum 130a on the side adjacent yoke 112a. With this arrangement, the unsupported reaches of the cable may be very short, and the overall length of the cable remains substantially constant as the yoke swings. Hence no spring is required for tensioning the cable, and both cable ends may be positively anchored.

Fig. 10 represents electrical circuit means adapted for use in connection with the described instrument. The output transducer is indicated schematically at 150, with its primary winding 154 connected to a source of alternating current input voltage indicated at 255. The secondary winding 155 of the transducer is connected to output terminals indicated at 256. Those terminals may be considered to represent any suitable indicating or control mechanism adapted to utilize a signal of the type produced by the transducer. Transducer rotor 156 may be driven in any suitable manner, not explicitly indicated in Fig. 10, for example as already described. A capacitor 257 is preferably connected in shunt to secondary winding 155 to adjust the phase of the output signal, so that it is substantially of the same or opposite phase as input voltage 255, depending upon the direction of displacement of rotor 156 from its zero position.

A variable resistor 258 is connected as a potentiometer in the circuit of primary winding 154, and may be manually adjusted to vary the effective input voltage and thereby to set the magnitude of the output signal at any desired value per unit of rotor displacement, as already described. Alternatively, resistor 258 or its equivalent may be controlled automatically, as under control of the same physical quantity that determines rotation of rotor 156. In particular, capsule 40 may be linked to resistor 258, as indicated in Fig. 10 by the dashed line 259 and the lever 260 which is pivoted at 260a and driven by the capsule. With such control, the factor of proportionality between the output signal and the angular displacement of rotor 156 is a function of the altitude. Such a functional relation may be useful, for example, to compensate in full or in part for the decreasing rate of pressure change with altitude as the altitude increases.

An illustrative manner of mounting potentiometer 258 in an instrument of the present type is shown in Figs. 1–3. The potentiometer winding 258 may be mounted on a bracket 263 on the exterior of housing 56, and the potentiometer brush 264 may be mounted in insulated relation on actuator shaft 70. Lever 260 of Fig. 10 may then be considered to represent actuator arm 90, for example.

Fig. 10 shows schematically the winding 173 of solenoid 172, already described. That winding is connected to a suitable source of voltage, indicated at 261, via a control switch 262. Switch 262 may be manually operable, or may be controllable in any desired manner for energizing the solenoid winding as required, for example at a desired time, or when the aircraft has reached a predetermined altitude, or in accordance with any other required condition. In particular, switch 262 may be controlled directly by capsule 40, such control being represented schematically in Fig. 10 by the lever 260 and a linkage indicated by broken line 259a between that lever and the switch arm. That type of switch control provides a particularly convenient manner of producing solenoid energization at a predetermined altitude.

We claim:

1. A pressure responsive device, comprising a frame, structure mounted with respect to the frame and forming a chamber that is deformable in response to fluid pressure applied thereto, an output member movably mounted with respect to the frame, output means responsive to movement of the member and acting to develop a signal that represents the position of the member, driving means releasably engageable between the chamber and the output member and acting when engaged to cause movement of the output member in response to chamber deformation, caging means releasably engageable between the output member and the frame and acting when engaged to confine the output member to a definite position with respect to the frame, and solenoid control means comprising a solenoid coil and two solenoid armatures movable in response to selective energization of the coil, movement of one armature acting to control engagement of the driving means and movement of the other armature acting to control engagement of the caging means.

2. A pressure responsive device, comprising a frame, structure mounted with respect to the frame and forming a chamber that is deformable in response to fluid pressure applied thereto, an output member movably mounted with respect to the frame, output means responsive to movement of the member and acting to develop a signal that represents the position of the member, driving means releasably engageable between the chamber and the output member and acting when engaged to cause movement of the output member in response to chamber deformation, caging means releasably engageable between the output member and the frame and acting when engaged to confine the output member to a definite position with respect to the frame, and solenoid control means comprising a solenoid coil and two solenoid armatures movable in response to selective energization of the coil, movement of one armature causing engagement of the driving means and movement of the other armature causing release of the caging means, the armatures being so arranged with respect to the coil that the movement of said one armature precedes the movement of said other armature.

3. A pressure responsive device as defined in claim 2, and in which the movement of said one armature increases the force exerted by the energized solenoid upon the other armature, and movement of the other armature is completed in response to that increased force.

4. A pressure responsive device, comprising a frame, structure mounted with respect to the frame and forming a chamber that is deformable in response to fluid pressure applied thereto, an output member movably mounted with respect to the frame, output means responsive to movement of the member and acting to develop a signal that represents the position of the member, driving means releasably engageable between the chamber and the output member and acting when engaged to cause movement of the output member in response to chamber deformation, caging means releasably engageable between the output member and the frame and acting when engaged to positively confine the output member to a definite position with respect to the frame, said caging means comprising a caging formation fixedly mounted on the output member, a caging member mounted on the frame and movable through a predetermined range of movement with respect thereto between a caging position and a releasing position, yoke means carried by the caging member in position to engage said caging formation and thereby positively confine the output member to a definite position when the caging member is in said caging position and also when the caging member is between said caging position and an intermediate point of its movement spaced therefrom, the yoke means being spaced from the caging formation in said releasing position of the caging element, control means actuable to shift the caging member from caging to releasing position, and means acting in response to actuation of said control means to cause engagement of said driving means while the caging member is between its caging position and said intermediate point.

5. A pressure responsive device, comprising a frame, structure mounted with respect to the frame and forming a chamber that is deformable in response to fluid pressure applied thereto, an input shaft and an output shaft coaxial therewith, first bearing means journaling one end of the input shaft with respect to the frame, second bearing means journaling the other end of the input shaft with respect to the output shaft, third bearing means journaling one end of the output shaft with respect to the input shaft, fourth bearing means journaling the other end of the output shaft with respect to the frame, one of said shafts having a tubular portion which encloses the portion of the other shaft between said second and third bearing means, clutch means comprising releasably engageable clutch elements mounted, respectively, on said one shaft and on the portion of said other shaft between said first and third bearing means, output means mounted on the output shaft and acting to develop a signal that represents the position of that shaft, and a driving connection between the chamber and the input shaft, and including a caging arm mounted on the output shaft, a caging formation mounted with respect to the frame for axial movement between a caging position in which it engages and confines the caging arm and an idle position in which it releases the caging arm, and control means comprising an annular solenoid winding coaxially mounted between the clutch means and the caging formation, and armature means responsive to energization of said winding for shifting the caging formation from caging to idle position only after engagement of said clutch means.

6. A pressure responsive device, comprising a frame, structure mounted with respect to the frame and forming a chamber that is deformable in response to fluid pressure applied thereto, an input shaft having one end journaled on the frame, an output shaft comprising a tube coaxially surrounding the other end of the input shaft and having one end journaled thereon, two oppositely facing journal type jewel bearings mounted in the other end of the tube, a thrust plate mounted in the tube between the said jewel bearings, a bearing pivot on the other end of the input shaft and engaging one of the jewel bearings, a bearing pivot mounted on the frame and engaging the other jewel bearing, the ends of said bearing pivots engaging opposite faces of said thrust plate, clutch means releasably engageable between the two shafts, output means mounted on the output shaft and acting to develop a signal that represents the position of that shaft, and a driving connection between the chamber and the input shaft.

References Cited in the file of this patent

UNITED STATES PATENTS

| | | |
|---|---|---|
| 1,059,244 | Werd | Apr. 15, 1913 |
| 1,350,769 | Bartlett | Aug. 24, 1920 |
| 1,505,110 | Von Post | Aug. 19, 1924 |
| 1,695,919 | Gould | Dec. 18, 1928 |
| 2,027,275 | Foster | Jan. 7, 1936 |
| 2,212,823 | Bulk | Aug. 27, 1940 |
| 2,491,341 | Tillman | Dec. 13, 1949 |
| 2,498,317 | Tubbs | Feb. 21, 1950 |
| 2,512,902 | Rossire | June 27, 1950 |
| 2,689,951 | Argentieri | Sept. 21, 1954 |
| 2,697,218 | Glenny | Dec. 14, 1954 |
| 2,751,576 | Soergel et al. | June 19, 1956 |